(12) United States Patent
Li et al.

(10) Patent No.: US 9,013,282 B2
(45) Date of Patent: Apr. 21, 2015

(54) OBJECT TRACKING APPARATUS AND METHOD, AND SENSOR POSITION DESIGNATING METHOD

(75) Inventors: Ki Joune Li, Busan (KR); Hye Young Kang, Busan (KR); Joon Seok Kim, Busan (KR)

(73) Assignee: Institute for Research & Industry Cooperation, Busan University, Busan (KR)

( * ) Notice: Subject to any disclaimer, the term of this patent is extended or adjusted under 35 U.S.C. 154(b) by 189 days.

(21) Appl. No.: 13/512,091

(22) PCT Filed: Dec. 1, 2009

(86) PCT No.: PCT/KR2009/007117
§ 371 (c)(1),
(2), (4) Date: May 25, 2012

(87) PCT Pub. No.: WO2011/065616
PCT Pub. Date: Jun. 3, 2011

(65) Prior Publication Data
US 2012/0280798 A1  Nov. 8, 2012

(30) Foreign Application Priority Data
Nov. 30, 2009 (KR) .................. 10-2009-0117250

(51) Int. Cl.
*G05B 11/01* (2006.01)
*G06K 17/00* (2006.01)
(Continued)

(52) U.S. Cl.
CPC ........... *G06K 17/0022* (2013.01); *G01S 13/878* (2013.01); *G06K 7/10079* (2013.01); *G06K 2017/0045* (2013.01)

(58) Field of Classification Search
CPC ....... G08C 17/02; G06F 15/177; H04L 12/26; G01C 21/32
USPC ................ 705/14.58; 701/208, 410; 370/236; 455/62; 707/100; 379/201.07; 340/905, 340/10.6; 709/221
See application file for complete search history.

(56) References Cited

U.S. PATENT DOCUMENTS 5,289,183 A * 2/1994 Hassett et al. ................. 340/905
5,548,637 A * 8/1996 Heller et al. ............. 379/201.07
6,269,303 B1 * 7/2001 Watanabe et al. ............. 701/410
(Continued)

FOREIGN PATENT DOCUMENTS

JP 2006-350733 12/2006
KR 10-2003-0030033 4/2003
(Continued)

*Primary Examiner* — Steven Lim
*Assistant Examiner* — Kaleria Knox
(74) *Attorney, Agent, or Firm* — Sherr & Jiang, PLLC

(57) ABSTRACT

The apparatus for tracking an object and the method thereof and the method for locating a sensor are described. The subject object tracking apparatus comprises an interface receiving sensor information and object information from a sensor communicated with an object; a first storing part successively storing sensor information in chronological order; a second storing part storing a neighborhood graph displaying an object space; and a location determining part determining a location of an object using sensor information and a neighborhood graph. According to the present invention, an accessibility graph corresponding to a space is generated and a location of a sensor is determined on an accessibility graph, thereby effectively locating a sensor and tracking an object.

14 Claims, 12 Drawing Sheets

(51) Int. Cl.
*G01S 13/87* (2006.01)
*G06K 7/10* (2006.01)

(56) References Cited

U.S. PATENT DOCUMENTS

| | | | |
|---|---|---|---|
| 6,985,750 B1 * | 1/2006 | Vicknair et al. | 455/519 |
| 7,055,107 B1 | 5/2006 | Rappaport et al. | |
| 8,509,696 B2 * | 8/2013 | Muraoka et al. | 455/62 |
| 2005/0203930 A1 * | 9/2005 | Bukowski et al. | 707/100 |
| 2006/0287762 A1 | 12/2006 | Takada et al. | |
| 2007/0115827 A1 * | 5/2007 | Boehnke et al. | 370/236 |
| 2008/0071892 A1 * | 3/2008 | Muro et al. | 709/221 |
| 2010/0198690 A1 * | 8/2010 | Gilvar et al. | 705/14.58 |

FOREIGN PATENT DOCUMENTS

| | | |
|---|---|---|
| KR | 10-0644783 | 12/2005 |
| KR | 10-2006-0031782 | 4/2006 |
| KR | 10-2006-0091836 | 8/2006 |
| KR | 10-2009-0036675 | 4/2009 |

* cited by examiner

Fig. 10

| tagID | leaderID | $t_s$ | $t_e$ |
|---|---|---|---|
| $tag_1$ | $leader_3$ | 1 | 3 |
| $tag_1$ | $leader_4$ | 3 | 5 |
| $tag_1$ | $leader_9$ | 9 | 11 |
| $tag_1$ | $leader_{10}$ | 11 | 13 |
| $tag_1$ | $leader_{10}$ | 30 | 32 |
| $tag_1$ | $leader_9$ | 32 | 34 |

OBJECT TRACKING APPARATUS AND METHOD, AND SENSOR POSITION DESIGNATING METHOD

CROSS REFERENCE TO PRIOR APPLICATIONS

This application is a National Stage Patent Application of PCT International Patent Application No. PCT/KR2009/007117 (filed on Dec. 1, 2009) under 35 U.S.C. §371, which claims priority to Korean Patent Application No. 10-2009-0117250 (filed on Nov. 30, 2009), which are all hereby incorporated by reference in their entirety.

BACKGROUND OF THE INVENTION

1. Field of the Invention

The present invention relates to an object tracking apparatus and a method thereof, and more particularly, to a method for efficiently locating an object tracking sensor, an object tracking apparatus and a method thereof.

2. Description of the Related Art

An efficient way of determining the location of an object having a tag is required. RFID is a technology that incorporates the use of electromagnetic or electrostatic coupling in the radio frequency portion of the electromagnetic spectrum to identify an object, animal, or person. RFID does not require direct contact or line-of-sight scanning, and thus it is coming into increasing use in industry as an alternative to the bar code.

A typical RFID system comprises an antenna, a reader, and a tag (or a transponder).

The antenna uses radio frequency waves to transmit a signal that activates the tag. When activated, data transmission using RFID can be done by that the tag transmits its data to the antenna, the antenna is connected to the reader and receives data from the tag. Tags come in two varieties, active and passive tags. The active tag transmits as far as several tens of meters or more. In contrast, the transmission range of the passive tag is limited to a few centimeters.

And, RFID is a technology that uses radio waves to identify an object having a tag. It stores object information in the tag, and uses the RFID reader to read tag information. RFID based location sensing system using thereof analyzes a sensing range of the RFID reader and determines a location of the tag.

RFID readers cost much more than RFID tags, and thus an efficient way of determining a location of an object having a tag using a small number of readers is required.

SUMMARY OF THE INVENTION

Accordingly, the present invention is conceived to solve the aforementioned problems. An object of the present invention is to provide a method for locating an object tracking sensor in space, a method for tracking an object from the designated sensors and an apparatus thereof.

According to an aspect of the present invention for achieving the objects, there is provided an object tracking apparatus by communicating with a plurality of sensors, which comprises an interface receiving sensor information and object information from sensors communicated with the object; a first storing part successively storing the sensor information in chronological order; a second storing part storing a neighborhood graph displaying the object space; and a location determining part determining a location of the object using the sensor information and the neighborhood graph.

And, it is desirable that the neighborhood graph comprises a black node corresponding to a subspace of the space, a link corresponding to a passage connecting subspaces, a white node corresponding to a coverage area of the sensor.

Also, it is desirable for the neighborhood graph that the black node neighboring to the white node is one and less.

And, it is desirable for the neighborhood graph that a neighbor node of the black node is the white node.

Also, as to the location determining part, in tracking real-time location of the object, it is desirable to determine that the object is in a coverage area of the first sensor if it receives the first sensor and the object information from the first sensor of the plurality of sensors.

And, as to the location determining part, in tracking real-time location of the object, it is desirable to read newly stored sensor information from the first storing part, determine a white node corresponding to a sensor having the sensor information from the neighborhood graph, and determine a subspace corresponding to a black node neighboring to the white node as a location of the object, if it does not receive the object information from the plurality of sensors.

According to an aspect of the present invention for achieving the objects, there is provided a method for tracking an object by communicating with a plurality of sensors, which comprises the steps of receiving sensor information and object information from the sensor communicated with the object; successively storing the sensor information in chronological order based on the object information; and determining a location of the object using the neighborhood graph corresponding to the sensor information and the object space information.

And, it is desirable that the neighborhood graph comprises a black node corresponding to a subspace, a link corresponding to a passage connecting subspaces, and a white node corresponding to a coverage area of the sensor.

Also, it is desirable for the neighborhood graph that the black node neighboring to the white node is one and less.

And, it is desirable for the neighborhood graph that a neighbor node of the black node is the white node.

Also, as to the step of determining a location of the object, in tracking real-time location of the object, it is desirable to determine that the object is in a coverage area of the first sensor if it receives the first sensor information and the object information from a first sensor of the plurality of sensors.

And, as to the step of determining a location of the object, in tracking real-time location of the object, it is desirable to determine a sensor having newly stored sensor information, determine a white node corresponding to the sensor from the neighborhood graph, and determine a subspace corresponding to a black node neighboring to the white node as a location of the object, if it does not receive the object information from the plurality of sensors.

Meanwhile, according to an aspect of the present invention for achieving the objects, there is provided a method for locating an object tracking sensor, which comprises the steps of generating an accessibility graph consisting of a plurality of black nodes corresponding to a plurality of subspaces and a link corresponding to a passage connecting subspaces of the plurality of subspaces; adding a white node to the accessibility graph to enable the space represented by the accessibility graph to be a trackable space. Here, the white node is a location of the sensor.

As to the step of adding the white node, it is desirable to add the white node to the accessibility graph so that black node neighboring to the white node is one and less.

Also, it is desirable to add the white node to the accessibility graph so that a neighbor node of the black node is a white node.

And, it is desirable that the white node is added between different black nodes of the plurality of black nodes.

According to the present invention, a location of a sensor is determined on the accessibility graph by generating an accessibility graph corresponding to a space, thereby effectively locating a sensor and tracking an object.

BRIEF DESCRIPTION OF THE DRAWINGS

FIG. 10 illustrates tag and reader information stored in a first storing part.

DESCRIPTION OF THE PREFERRED EMBODIMENT

Hereinafter, the present invention will be described in detail with reference to the accompanying drawings.

Symbolic space of the present invention means space representing its location by reference information, not by coordinate information. Space created by address and space identified by room number are symbolic spaces. When an object moves in a symbolic space, managers concern whether an object is in a specific space, not accurate coordinate information. Thus, methods for properly installing a sensor and tracking an object in space where the sensors are installed are required to track an object responding to their interests.

RFID reader is an example of the aforementioned sensors, but it is not for a limitation. It may be any sensors as long as it allows to track an object. In the embodiments, for convenient explanation, sensors are used to explain RFID reader and RFID tag.

Figure 1:
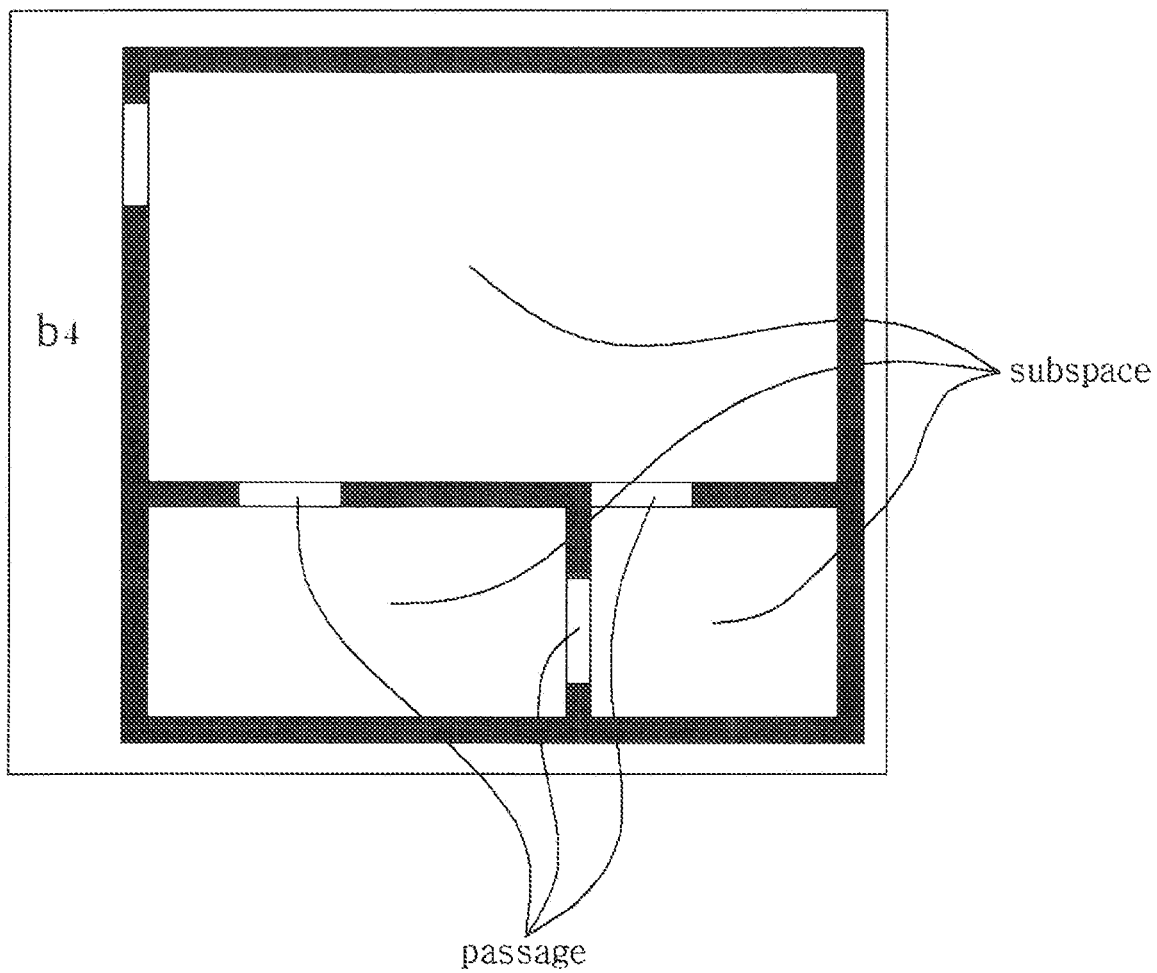
FIG. 1 is a drawing of a symbolic space.

FIG. 1 is a drawing of a symbolic space. As shown in FIG. 1, there is a way to determine a location of an object in a symbolic space: defining a coverage of an RFID reader as the size of a grid, dividing space into leads, and installing RFID reader in the center of the grid. However, this method requires large number of readers and thus waste money.

Figure 2:
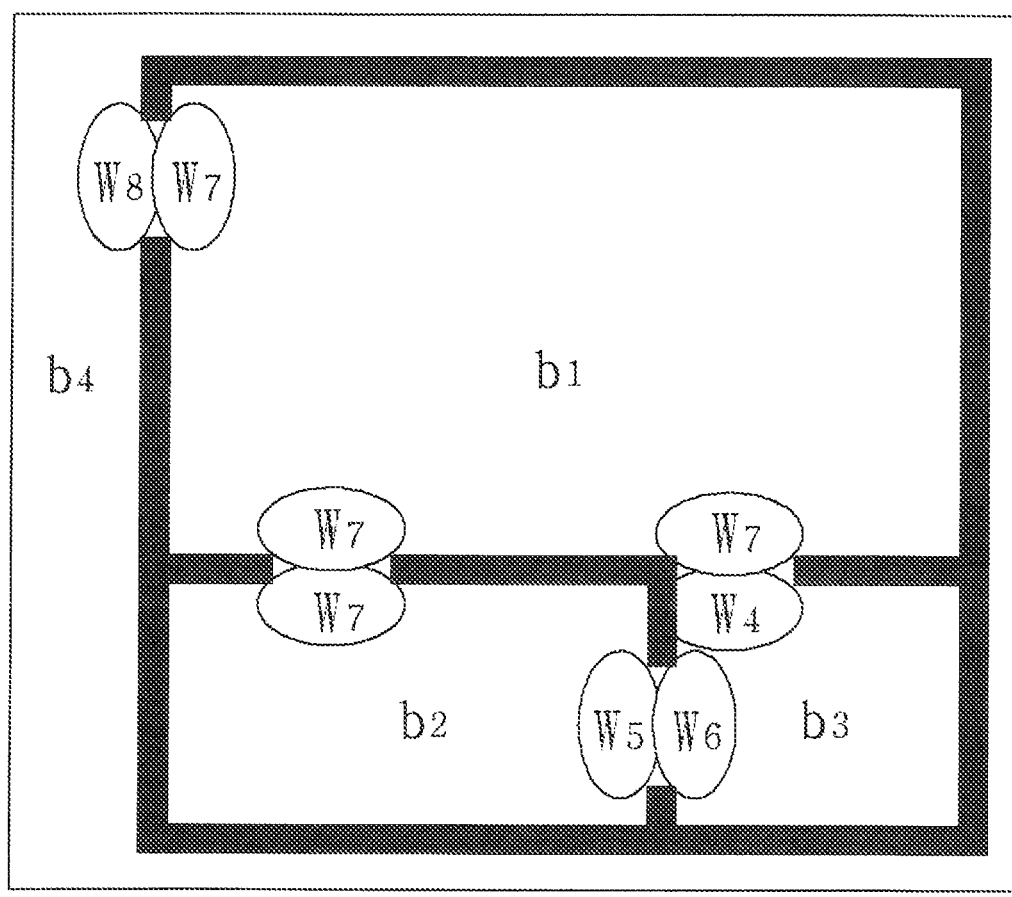
FIG. 2 is a drawing showing a method for installing of a RFID reader in a symbolic space.

FIG. 2 is a drawing showing a method for installing of an RFID reader in a symbolic space. As shown in FIG. 2, RFID readers are installed on both ends of passage connecting the spaces. If the object enters from a specific space to other space, at least two RFID readers recognize it. It enables to determine a moving path of an object based on the order of recognized RFID readers, and enables to determine a real-time location of an object.

For convenient explanation, an area where an object is detectable by an RFID reader is called White Cell:Wi, and an area where an object is not detectable by an RFID reader is called Black Cell:Bj. That is, White Cell:Wi is a coverage area of an RFID reader.

As shown in FIG. 2, an area where an object is detectable based on a location of an RFID reader is represented by White Cell:Wi (where i is any one of 1 to 8), and all other areas are represented by Black Cell:Bj (where j is any one of 1 to 4). When white cells and black cells are properly placed in indoor space, a location of an object can be easily determined.

Meanwhile, a symbolic space can be converted into an accessibility graph for making it easy to understand the relationships of subspaces in symbolic space. Accessibility graph comprises a node and a link, wherein a node is a black node corresponding to a black cell and a white node corresponding to a white cell, a link is corresponded to a passage connecting subspaces.

Figure 3:
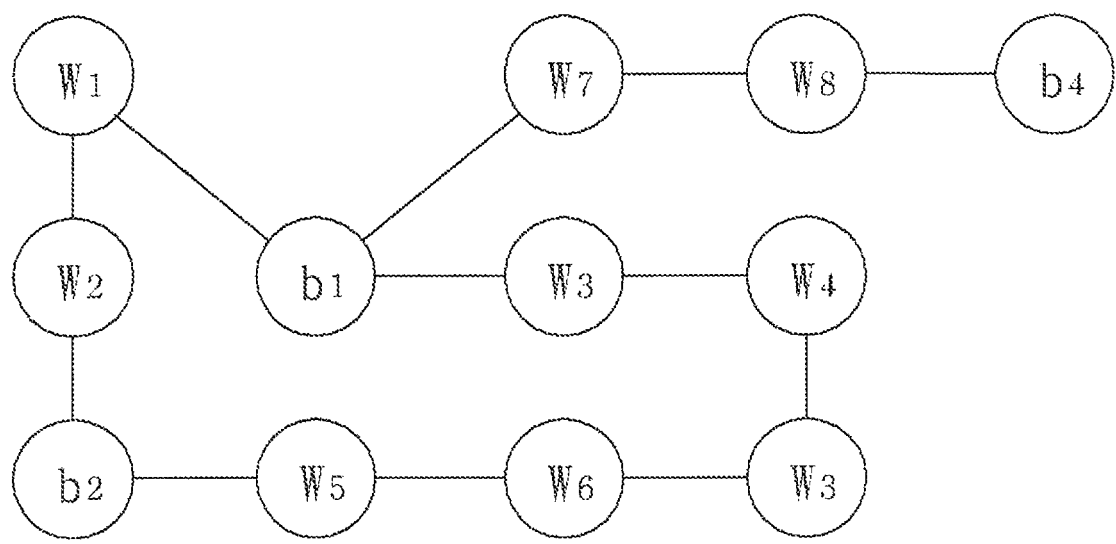
FIG. 3 illustrates an accessibility graph corresponding to the space of FIG. 2.

FIG. 3 is an accessibility graph corresponding to the space of FIG. 2. Using the accessibility graph in FIG. 3, an observer can easily determine a location of an object even if he does not know the exact geometrical structure of space.

If an object having an RFID tag is within a coverage of an RFID reader, a location of an object will be the coverage area. If an RFID reader is outside of the coverage, a location of an object cannot be determined. Equation 1 expresses the measured value by an RFID reader as a function p.

$$p(m,t)=c(c \in W \text{ or } c=\text{NULL})$$ Equation 1

The Equation 1 means that an object m is in white cell at time t if the value of p(m, t) is white cell. If p(m, t) is null, an object m is not in white cell at time t, and thus additional tracking process is needed.

Pos (m, t), a location of an object m at time t, is shown below in equation 2.

$$Pos(m,t)=p(m,t) \text{ if } p(m,t) \in W$$

$\hat{p}=(m, t)$ otherwise

As shown in equation 2, if pos (m, t), a location of an object m at time t, does not exist in white cell, a separate track is required.

The following is a moving path of an object referencing to the FIG. 2 and FIG. 3. For example, if p(m, t2)=NULL when p(m, t1)=w1 and p(m, t3)=w3 for t1<t2<t3, it is obvious that pos(m, t2)==b1. Like this example, the location can be crucially estimated under certain conditions. Meanwhile, if p(m, t3)=NULL and p(m,t5)=NULL for t3<t4<t5, then it is impossible to crucially track p(m, t4).

Thus, it is necessary to properly arrange RFID readers for ease object tracking, and if a location of an object can be crucially estimated, this space is called Trackable Symbolic Space:TSS.

In order to establish a Trackable Symbolic Space, following two conditions should be satisfied.

The First Condition

The black cell (or black node) neighboring the white cell (or white node) should be one and less.

The Second Condition

Neighbor cell (or node) of the black cell (or black node) should be white cell (or white node).

Figure 4:
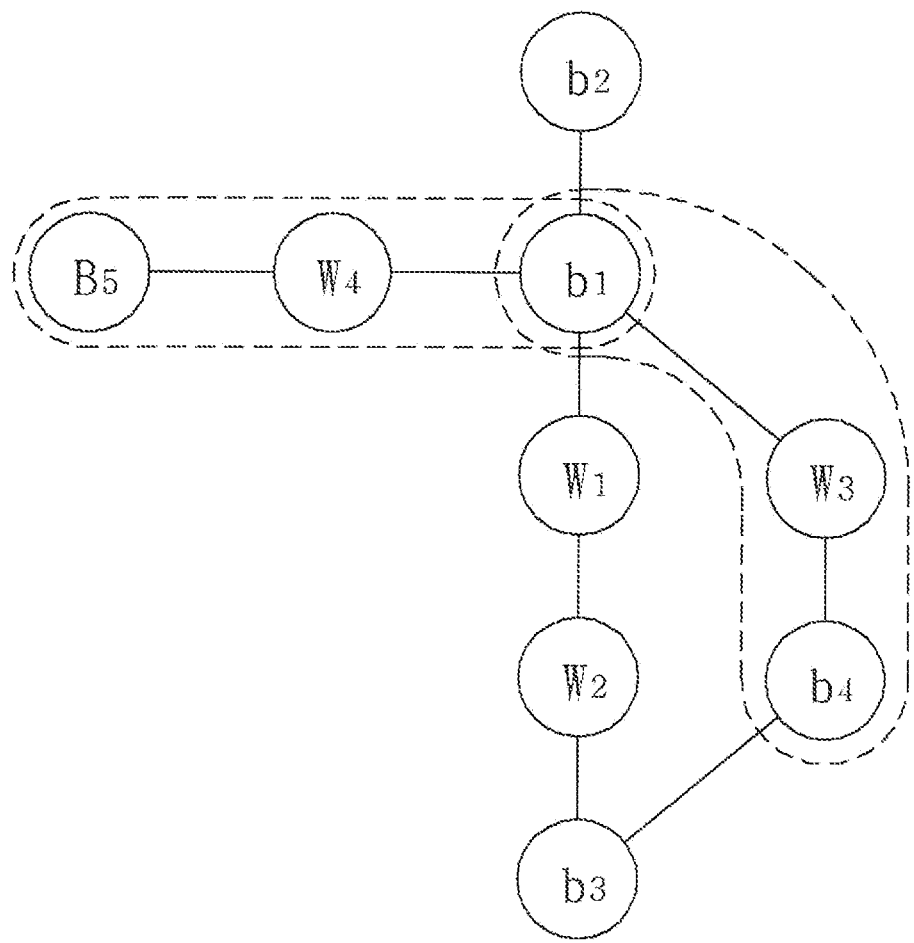
FIG. 4 illustrates an accessibility graph wherein it is unable to be a trackable symbolic space violating the first condition.
Figure 5:
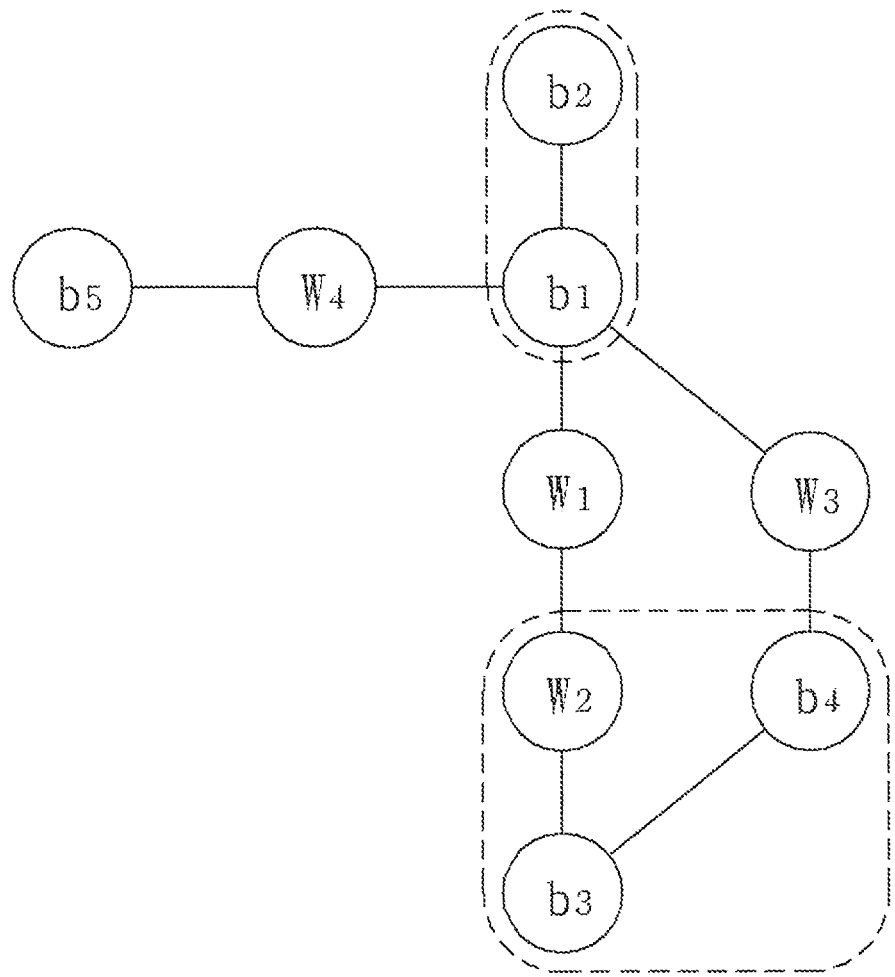
FIG. 5 illustrates an accessibility graph wherein it is unable to be a trackable symbolic space violating the second condition.

FIG. 4 is an accessibility graph wherein it is unable to be a trackable symbolic space violating the first condition, and FIG. 5 is an accessibility graph wherein it is unable to be a trackable symbolic space violating the second condition. In the FIG. 4, if p(m, t1)=w3 and p(m, t2)=NULL, a location of an object at t3 can be b1 or b4. Thus, if black node neighboring white node is more than two, a location of moving object cannot be determined. In the FIG. 5, if (m, t1)=w2 and p(m, t2)=NULL, a location of moving object at t3 can be b3 or b4. Thus, if a neighbor node of a black node is not a white node, a location of moving object cannot be determined.

Eventually, an accessibility graph should be TSS to track an object in space. To make this TSS, a large number of white cells need to be installed. However, white cell corresponds to a single RFID reader. Accordingly, it is important to reduce the number of white cells while maintaining accuracy in the economic aspects. That is, it is useful to make a given set for black cells into TSS by arranging the smallest number of white cells.

Figure 6:
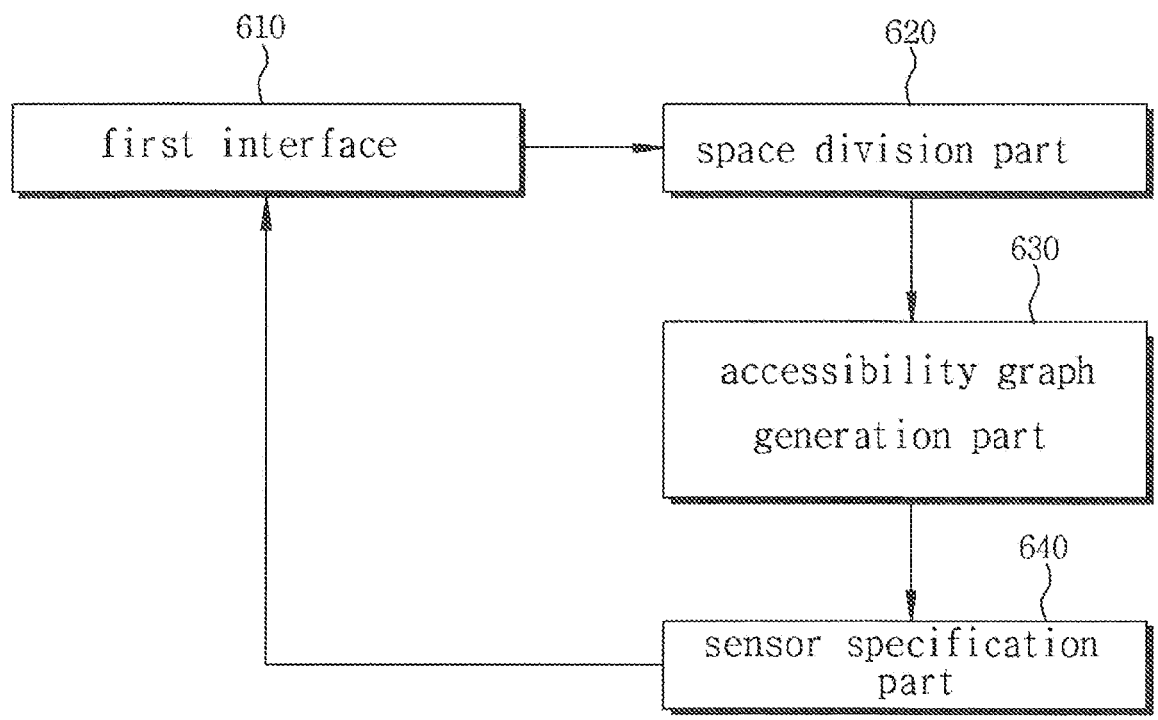
FIG. 6 is a block diagram showing a sensor location server determining a location of a sensor to embody a trackable symbolic space.

FIG. 6 is a block diagram showing a sensor location server for locating a sensor to embody a trackable symbolic space.

As shown in FIG. 6, a space division part (620) divides space into a plurality of basic spaces depending on nature of space in a symbolic space when symbolic space information is entered through a first interface (610). Basic space may be a room, a passage and a sensor area. A subspace is surrounded by walls, etc, and thus recognized as an independent space. A passage, a space connecting subspaces, is in a RFID reader coverage. A sensor area, a space with installed sensor, technically means a sensor coverage area.

An accessibility graph generation part (630) generates an accessibility graph based on basic space divided in a space division part (620). Specifically, it generates an accessibility graph using a subspace as a black node, a passage as a link connecting nodes and a sensor area as a white node. A sensor specification part (640) specifying a location of a sensor using the accessibility graph generated in an accessibility graph generation part (630) for a trackable symbolic space.

Figure 7:
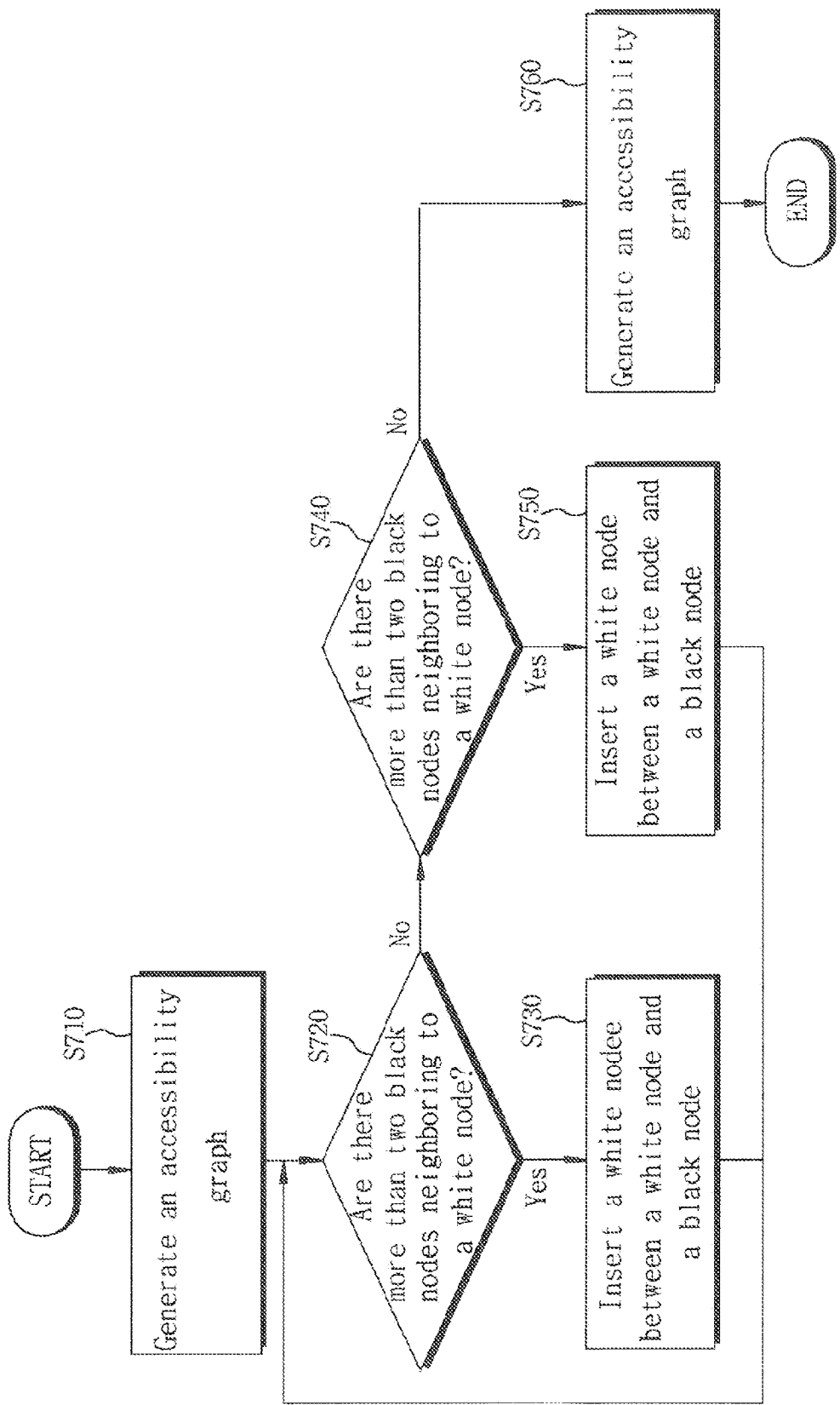
FIG. 7 is a flowchart illustrating a method for locating a sensor to enable a symbolic space to be a trackable space.

FIG. 7 is a flowchart illustrating a method for locating a sensor to enable a symbolic space to be a trackable space.

Once an accessibility graph generation part (630) generates an accessibility graph (S710), a sensor specification part (640) determines if there are more than two black nodes neighboring to a white node in an accessibility graph (S720). More than two black nodes neighboring to a white node means that a single sensor is installed between the subspaces. This is the case that a location of an object cannot be determined when an object in a sensor area moves to a subspace, and it is a violation of the first condition of TSS.

If there are more than two black nodes neighboring to white node (S720-Y), a sensor specification part (640) inserts a white node between a white node and a black node (S730). This means that another sensor is installed between a subspaces overlapping the part of existing sensor area.

A sensor specification part (640) determines if there is a neighboring black node (S740). The meaning of 'there is a neighboring black node' is that a sensor is not installed in a passage connecting subspaces, and it is a violation of the second condition of TSS.

Therefore, a sensor specification part (640) inserts a white node between neighboring black nodes (S750). This means that a sensor is specified in a passage.

By repeating S720 to S750, if black node neighboring white node is one and less, and a neighbor node of a black node is a white node, accessibility graph upgraded by a sensor specification part (640) is a representation of a trackable symbolic space.

Therefore, a sensor specification part (640) outputs an accessibility graph representing a trackable symbolic space through an interface. Then, a manager can track a space with proper number of sensors by installing sensors like an RFID reader in space corresponding to a newly generated white node.

Figure 8:
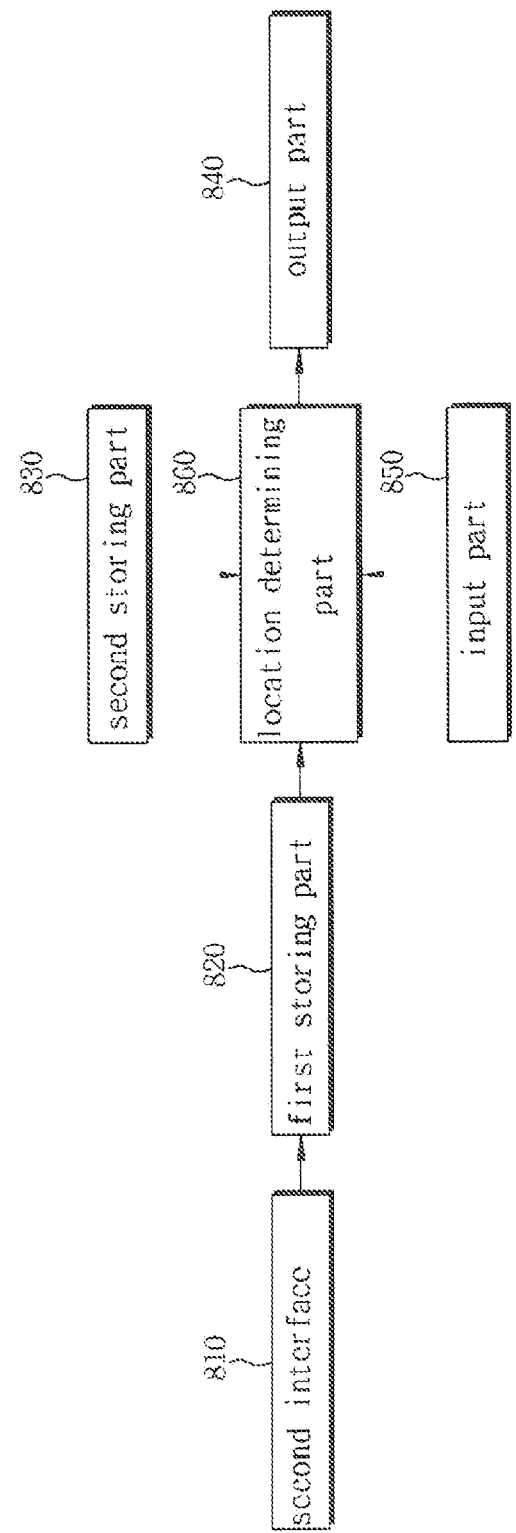
FIG. 8 illustrates an object tracking apparatus for tracking an object in a trackable symbolic space.

FIG. 8 is an object tracking apparatus for tracking an object in a trackable symbolic space.

An object tracking apparatus is an apparatus, wherein a tag tracks a location using an RFID tag identification information and reader location information received from an RFID reader, comprises a second interface (810), a first storing part (820), a second storing part (830), a location determining part (850), an input part (850) and an output part (840).

A second interface (810) communicates with a reader, receives reader identification information and tag identification information, and authorizes to a first storing part (820).

A first storing part (820) stores RFID reader information with times based on RFID tag information. Specifically, an object having an RFID tag is moving through space. If an object is in a coverage area of an RFID reader, an RFID reader receives RFID tag information, and transmits RFID tag information and RFID reader information to an object tracking apparatus. Then, a first storing part (820) stores RFID reader information in chronological order.

A second storing part (830) stores symbolic space information. Specifically, it is desirable that an accessibility graph of a trackable symbolic space is stored in a second storing part (830).

A location determining part (850) tracks a location of an object having an RID tag at a certain time or a moving path of an object using RFID reader information and an accessibility graph. And, an output part (840) outputs a location or a moving path of an object.

Figure 9:
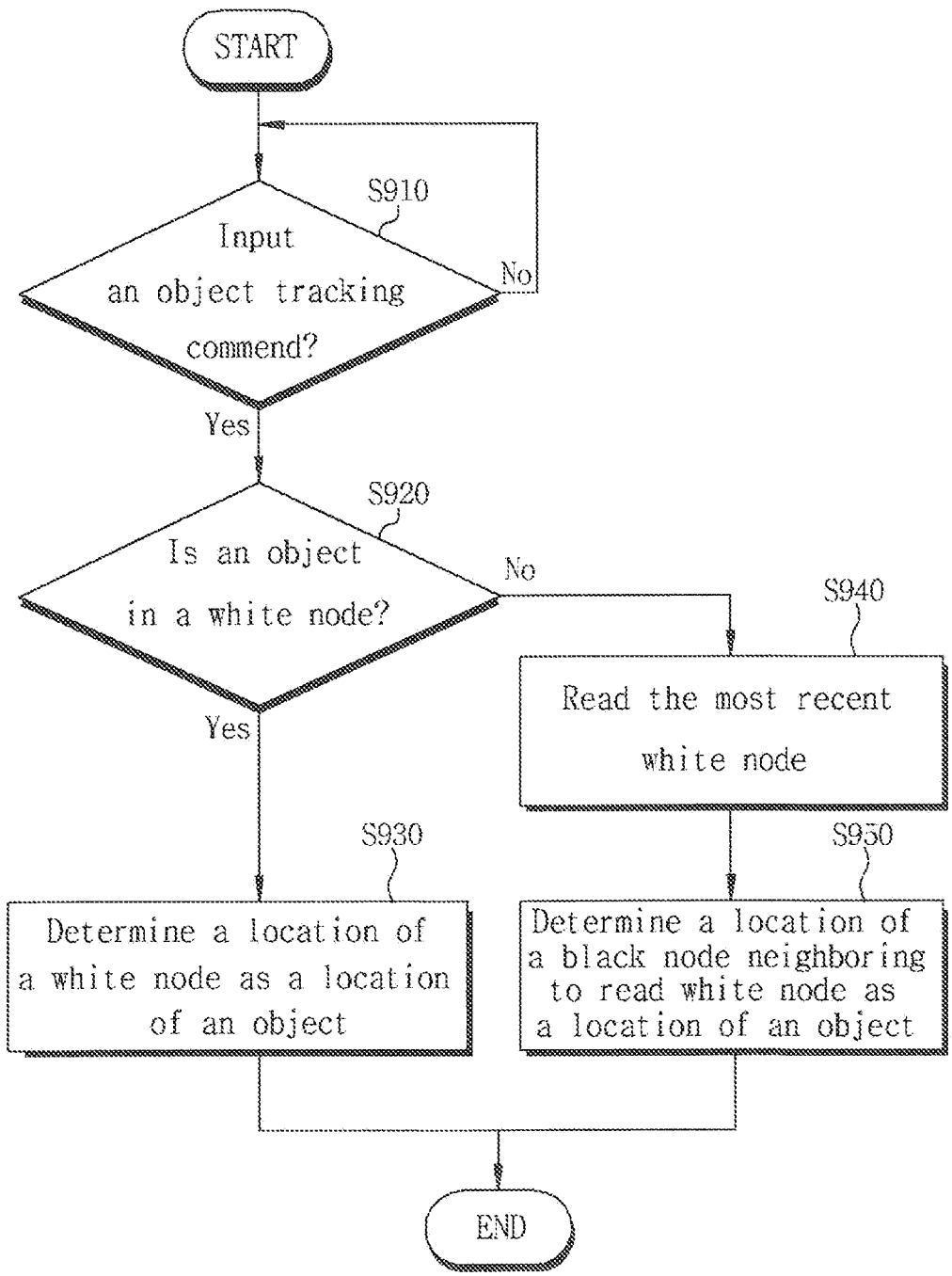
FIG. 9 is a flowchart illustrating a method for tracking an object in a trackable symbolic space.

FIG. 9 is a flowchart illustrating a method for tracking an object in a trackable symbolic space.

If a commend to track an object having an RFID tag is entered through an input part (850) (S910-Y), a location determining part (850) determines if an object is in a white node (S920). Specifically, if there is an object having an RFID tag in a white cell at the moment, an RFID reader in this white cell transmits RFID tag identification information and RFID reader identification information to an object tracking apparatus, and a first storing part (820) stores RFID tag identification information, RFID reader identification information, and transmission time. And, a location determining part (850) assumes that an object is in a white node by reading current received RFID reader identification information from a first storing part (820), and reading a white node corresponding to the RFID reader from a second storing part (830).

If judged that an object is in a white node (S920-Y), a location determining part (850) determines a location of a white node as a location of an object, and outputs results (S930).

Meanwhile, if judged that an object is not in a white node (S920-Y), a location determining part (850) reads the most newly white node (S940). That is, if RFID reader identification information is not stored in a first storing part (820) by not receiving identification information from RFID reader, a location determining part (850) assumes that an object is not in a white node at the moment. And, it reads RFID reader identification information stored in a first storing part (820) corresponding to the most newly white node.

And, a location determining part (850) searches a white node corresponding to the read RFID reader identification information in a second storing part (830), and determines a black node neighboring to a white node as a current location of an object (S950). And, it outputs results.

Figure 11:
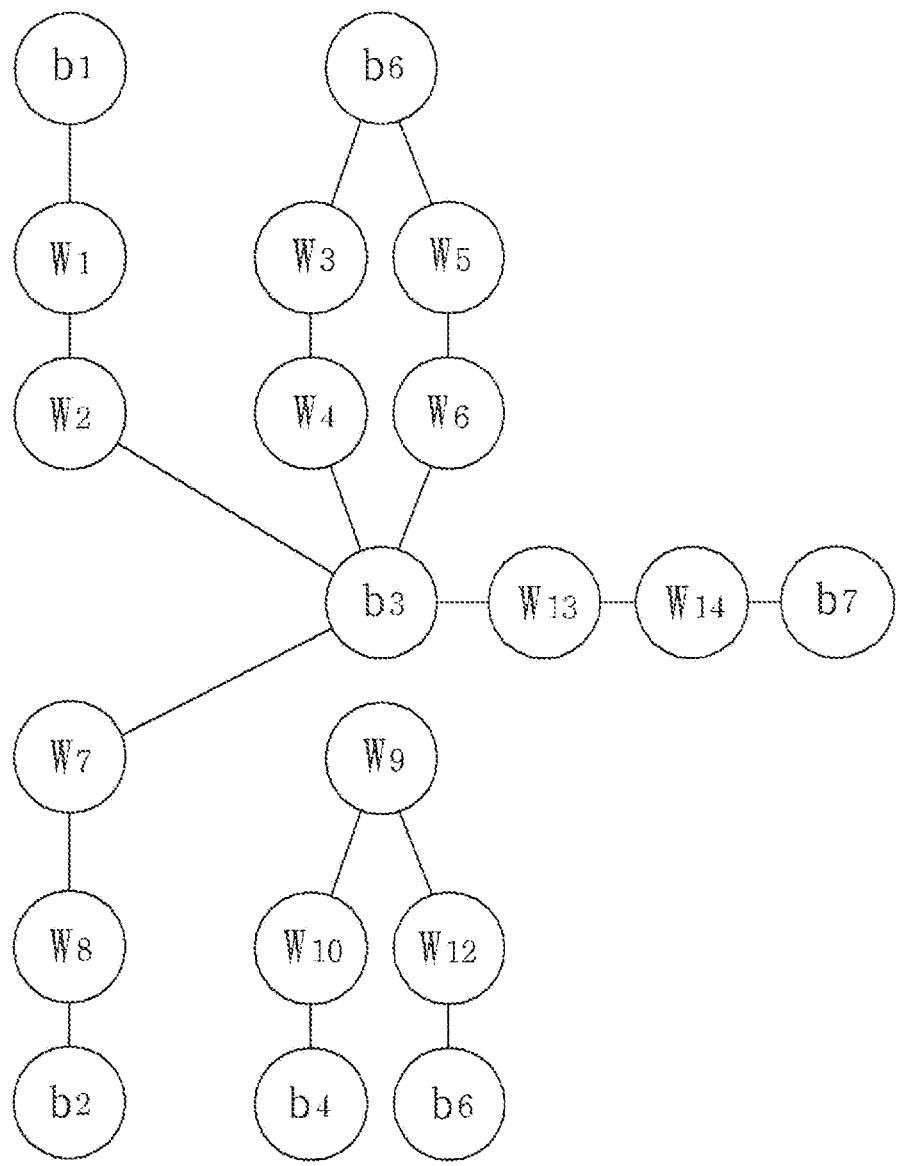
FIG. 11 illustrates a neighborhood graph stored in a second storing part.
Figure 12:
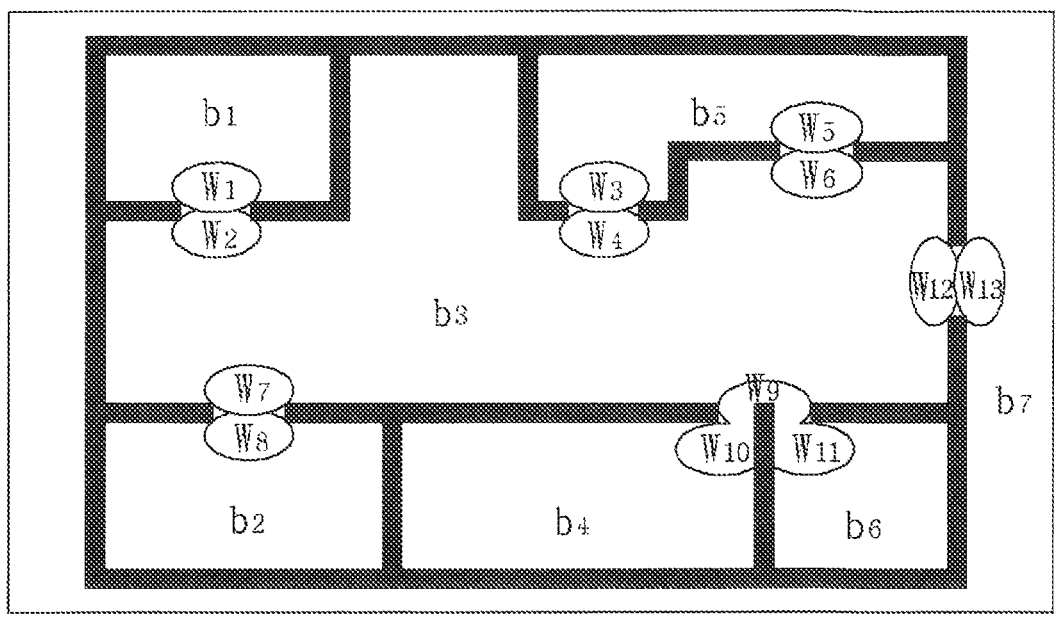
FIG. 12 is a drawing of the space corresponding to the neighborhood graph of FIG. 11.

FIG. 10 is the tag and reader information stored in a first storing part (820), FIG. 11 is a neighborhood graph stored in a second storing part (830), and FIG. 12 is a drawing of a space corresponding to the neighborhood graph of FIG. 11. In the FIG. 10, is and to mean time for RFID tag staying in an RFID reader coverage.

A location determining part (850) can track a moving path of tag 1 using FIG. 10 and FIG. 11. That is, it can be shown that an object having a tag moves from space 6 (b6) to space 3 (b3) since reader 3 identifies the tag for 1<t<3, and reader 4 identifies the tag for 3<t<5. Also, it can be shown that an object having a tag moves from space 3 (b3) to space 5 (b5) since reader 9 identifies the tag for 9<t<11, and reader 10 identifies a tag for 11<t<13. And then, it can be shown that an object having a tag moves from space 5 (b5) to space 3 (b3) since reader 10 identifies the tag for 30<t<32, and reader 9 identifies the tag for 32<t<34. That is, a location determining part (850) determines a moving path of an object just by tag and reader information and neighborhood graph.

Especially, as shown in FIG. 11 and FIG. 12, white area 9 (W9) falls within a coverage area of a single RFID reader, and thus it is fine to install a single RFID reader. This means that a neighborhood graph may be amended by one installing of an RFID reader.

Likewise, it can be found that a moving path of an object may be tracked only if proper number of sensors are placed in space.

Also, even though the above explained the preferred embodiments of the present invention, it is important to note that the above embodiments are just for explanation, not for a limitation on the invention.

Also, it will be apparent that one having ordinary skill in the art can make various modifications and changes thereto within the scope of the present invention. Therefore, the true scope of the present invention should be defined by the technical spirits of the appended claims.

The present invention determines a location of a sensor on an accessibility graph by generating an accessibility graph corresponding to space, thereby efficiently locating an object tracking sensor, tracking an object.

What is claimed is:

1. An object tracking apparatus, which is provided to track a location of an object by communicating with a plurality of sensors, the apparatus comprising:
    an interface configured to receive sensor information and object information from sensors communicated with the object;
    a first storing part configured to successively store the sensor information, the sensor information comprising moving path in a space of one or more tags of objects identified by a plurality of sensors; a second storing part configured to store a neighborhood graph displaying an object space information, the object space information comprising a white node, a black node, and a link, the black node neighboring to the white node; and
    a location determining part configured to determine real-time location of the object using the sensor information and the neighborhood graph, wherein
    in response to detection of the sensor information detected by the one or more sensors, the location determining part is caused by a processor to determine the white node corresponding to a detecting sensor transmitting the sensor information, and
    to determine, using the neighboring graph, a subspace corresponding to a black node neighboring to the white node as a location of the object, if not receiving the sensor information from the plurality of sensors.

2. The object tracking apparatus as claimed in claim 1, wherein the neighborhood graph comprises a black node corresponding to a subspace of the space, a link corresponding to a passage connecting subspaces, a white node corresponding to a coverage area of the detecting sensor.

3. The object tracking apparatus as claimed in claim 2, wherein in the neighborhood graph, the black node neighboring to the white node.

4. The object tracking apparatus as claimed in claim 2, wherein in the neighborhood graph, a neighbor node of the black node is the white node.

5. The object tracking apparatus as claimed in claim 1, wherein the location determining part is further configured to determine whether the object is in the coverage area in response to detection of the sensor information and the object information transmitted a detecting sensor of the plurality of sensors.

6. The object tracking apparatus as claimed in claim 1, wherein the location determining part is configured to read newly stored sensor information associated with the first storing part, to determine the white node based on the neighborhood graph, and to determine a subspace corresponding to the black node neighboring to the white node as a location of the objects.

7. A method for tracking an object, the method comprising:
    receiving sensor information and object information from a sensor communicated with objects, the sensor information comprising moving path in a space of one or more tags of objects identified by a plurality of sensors;
    determining, by a processor, real-time location of the object using the sensor information and the neighborhood graph, the neighborhood graph displaying an object space information, the object space information comprising a white node, a black node, and a link, the black node neighboring to the white node,
    in response detection of the sensor information detected by the one or more sensors, determining the white node corresponding to a detecting sensor transmitting the sensor information, and
    determining a subspace corresponding to a black node neighboring to the white node as a location of the object, if not receiving the sensor information from the plurality of sensors.

8. The method for tracking an object as claimed in claim 7, wherein the accessibility graph comprises a black node corresponding a subspace of the space, a link corresponding to a passage connecting subspaces, and a white note corresponding a coverage area of the detecting sensor.

9. The method for tracking an object as claimed in claim 8, wherein in the accessibility graph, the black node neighboring to the white node.

10. The method for tracking an object as claimed in claim 8, wherein in the accessibility graph, a neighbor node of the black node is the white node.

11. A method for allocating a sensor associated with placing nodes for tracking a location of an object, the method comprising:
    generating a plurality of black nodes corresponding to a plurality of subspaces in a space and a link corresponding to a passage connecting each subspace of the plurality of subspaces; and
    adding a white node corresponding to sensors having the sensor information comprising moving path in a space of one or more tags of objects identified by a plurality of sensors;
    determining whether a number of the black node neighboring the white node is more than two;
    displacing a white node between the white node neighboring the black node; and outputting an accessibility graph to allocate the sensors based on the determination.

12. The method for allocating a sensor as claimed in claim 11, wherein the white node is added to the accessibility graph, wherein a number of the black node neighboring to the white node is one.

13. The method for allocating a sensor as claimed in claim 11, wherein the white node is added to the accessibility graph, wherein a neighbor node of the black node is a white node.

14. The method for allocating a sensor as claimed in claim 11, wherein the white node is added between different black nodes of the plurality of black nodes.

* * * * *